2,950,317

PROCESS FOR PREPARATION OF PERFLUOROALKYL SULFONYL CHLORIDES

Harvey A. Brown, East Oakdale Township, Washington County, and Ralph I. Coon, St. Paul, Minn., assignors to Minnesota Mining and Manufacturing Company, St. Paul, Minn., a corporation of Delaware No Drawing. Filed Oct. 21, 1957, Ser. No. 691,121

3 Claims. (Cl. 260—543)

This invention relates to a process for the preparation of fluorocarbon sulfonyl halides.

Heretofore fluorocarbons containing the sulfonyl chloride group have been made using a multiple-step process, by hydrolyzing fluorocarbon sulfonyl fluorides with strong aqueous alkali at high temperature to form the corresponding sulfonic acid salt, isolating the salt and reacting it with phosphorous pentachloride or with phosphorous pentachloride and zinc chloride at high temperatures to form the desired substituted sulfonyl chloride. Difficulties with this process, such as the handling of phosphorous pentachloride, necessary high temperature conditions and isolation of intermediates as well as a strong tendency of the reaction mixtures to foam and solidify combine to make it undesirable for use on a commercial scale.

It is the principal object of the present invention to provide an improved and simplified process for the preparation of fluorocarbon sulfonyl chlorides directly from fluorocarbon sulfonyl fluorides which are electrolytic cell products. Additional objects will be apparent from the specification which follows.

In accordance with the present invention it has been found that fluorocarbon sulfonyl chlorides can be obtained easily and good yield from fluorocarbon sulfonyl fluorides represented by the formula $$R_fSO_2F$$

wherein $R_f$ is a saturated fluorocarbon radical containing from 1 to 18 fluorinated carbon atoms, by first reacting the latter with hydrazine in an inert solvent, and then reacting the resulting fluorocarbon sulfonyl hydrazide intermediate with chlorine under aqueous or non-aqueous conditions and recovering the fluorocarbon sulfonyl chloride product as by distillation or the like.

The starting materials are readily available from the electrochemical fluorination process as described by Brice et al. in U.S. Patent 2,732,398. The process of the invention also overcomes other difficulties of the previously known processes and provides for the first time an efficient method for the large scale preparation of the valuable fluorocarbon sulfonyl chlorides.

In the course of the reaction, nitrogen and hydrogen chloride gases are evolved as well as a certain amount of hydrogen fluoride. The intermediate hydrazide appears to be unstable, and therefore is preferably not isolated. It has been found helpful to the smooth initiation of the reaction to introduce an amount of hydrogen chloride into the reaction mixture just before addition of the chlorine. The latter is added directly to the reaction mixture, ordinarily with cooling to prevent an uncontrollable rate of reaction.

While the hydrazides which are intermediates in the process can be prepared by interreaction of stoichiometric amounts of hydrazine and starting sulfonyl fluoride, it is preferred to use an excess amount of hydrazine.

Broadly speaking, the process is carried out in the presence of a mutual, inert solvent for the reactants, which may be hydrous or anhydrous. Examples of suitable solvents are chlorinated hydrocarbons, for example, carbon tetrachloride, 1,2-dichlorobenzene, 1,2,4-trichlorobenzene; hydrocarbons such as benzene, toluene, hexane, tetralin, xylene; ethers such as diethyl ether; and the like. The reaction with hydrazine and the introduction of chlorine are effected at moderate temperatures and preferably are carried out over a range of temperatures of from about —5° C. to 30° C. Lower temperatures than —5° C. can be employed, but may not be economically practical. While higher temperatures can likewise be used, the reaction is then more difficult to control and undesirable by-products may be formed. The temperature selected for use in the process tends to affect the length of time required for completion of the reactions, according to the inverse relationship between temperature and duration of reaction commonly encountered in processes of this type. A convenient indication of completion of the chlorination reaction in the present instance is the cessation of evolution of gas.

Because of the formation of hydrogen fluoride in the process, it is obvious that glass or glass-lined vessels are not practical for use in large-scale production. However, as is well-known, suitably corrosion-resistant or lined kettles and tanks, for example steel vessels lined with polytetrafluoroethylene or the like, can be employed.

Despite the presence of several fluorine atoms in the fluorocarbon portion of the starting materials used, the reaction involving the sulfonyl group appears to proceed without interference therefrom, and the fluorocarbon moiety can be widely varied, as exemplified in the Brice et al. patent referred to hereinabove.

The fluorocarbon group, $R_f$, is highly stable and inert. Ordinarily, when it contains five or more carbon atoms it is effectively repellent not only to water but also to oils and hydrocarbons and consequently imparts unique surface active properties not possessed by corresponding compounds having a hydrocarbon group, the latter being oleophilic, that is, highly soluble in oils and hydrocarbons.

The fluorocarbon group of the products of the present invention can be a perfluoroalkyl group having an open (acyclic) straight- or branched-chain, or a cyclic structure (e.g. a perfluorocyclohexyl group having a six-membered ring structure) or it can consist of a combination of perfluoroalkyl straight chain and perfluoro- homocyclic or -heterocyclic groups. The fluorocarbon group may be bonded to the sulfur atom of the molecule through either a cyclic or an acyclic carbon atom (that is, this carbon atom may or may not be in a ring) and two carbon atoms of the fluorocarbon group may be linked together by an oxygen atom or three carbons may be linked together by a nitrogen atom, since oxygen and nitrogen provide very stable linkages between fluorocarbon groups and do not interfere with the highly stable and inert character of the complete fluorocarbon group or structure, as is shown, for instance, in U.S. Patents Nos. 2,500,388 and 2,616,927.

The fluorocarbon sulfonyl fluoride starting materials for the present process are prepared in good yields by an electrochemical process which comprises electrolyzing a mixture of liquid hydrogen fluoride and a hydrocarbon sulfonic acid halide in a nickel-anode cell at a voltage of approximately 4 to 6 volts.

The fluorocarbon sulfonyl chloride products of the present invention are particularly useful as chemical intermediates in the preparation of other valuable fluorocarbon compounds. They may, for example, be reacted with ethylenically unsaturated compounds to form a wide variety of products which are particularly useful for their characteristic fluorocarbon surface-active properties. This reaction of the fluorocarbon sulfonyl chloride products of the present invention with ethylenically unsaturated compounds may be represented by the following equation:

$$R_fSO_2Cl + n(R'R''C=CR'''R'''') \rightarrow R_f(R'R''CCR'''R'''')_nCl + SO_2$$

wherein $R_f$ is as previously defined, $n$ is an integer, and $R'$, $R''$, $R'''$ and $R''''$ are the substituents carried by the carbon atoms adjacent to the double bond in the ethylenically unsaturated compound. The 1:1 adducts of the reaction (those in which $n$ is one) are ordinarily formed in significant quantities together, in most instances, with telomeric adducts including the 1:2 adduct (where $n$ is two).

A great number of ethylenically unsaturated compounds undergo this reaction (desulfonylative addition) with fluorocarbon sulfonyl chlorides. Among these compounds are alkenes such as 1-octene, unsaturated halides and alcohols such as allyl chloride and allyl alcohol; unsaturated carboxylic acids such as 10-hendecenoic acid; unsaturated esters such as allyl acetate; unsaturated alicyclic compounds such as cyclohexene; vinyl silanes such as vinylmethyldiethoxy silane, vinyl methyl dichlorosilane, vinyl trichlorosilane and vinyl triethoxy silane; etc.

Since such a wide variety of compounds may be prepared from the fluorocarbon sulfonyl chloride products of the present invention via the desulfonylative addition process (through variation of the substituents on the ethylenically unsaturated compound as well as through variations in the fluorocarbon radical), products which are found to be useful in a number of applications may be prepared. Some of these are surface coatings or treatments, polymers, waxes, hydraulic fluids, solvents, lubricants, etc. The products of the desulfonylative addition reaction may often be further altered for a particular application by additionally reacting them, for example, by hydrogenation, esterification, hydrolysis, polymerization, etc.

In order more clearly to disclose the nature of the present invention, the following examples illustrating specific preparations in accordance with the invention as well as the utility of certain products of the invention will be described. It should be understood however, that this is done solely by way of example and is intended neither to delineate the scope of the invention nor to limit the ambit of the appended claims.

EXAMPLE 1

About 502 grams (1.0 mole) of n-perfluorooctane sulfonyl fluoride and 1500 milliliters of carbon tetrachloride are placed in a round bottomed flask which is fitted with a reflux condenser, a dropping funnel and an agitator. The flask is placed in an ice bath and when the temperature of the n-perfluorooctane sulfonyl fluoride-carbon tetrachloride mixture has dropped to between 0° C. and 5° C., the dropwise addition of 96 grams (3 moles) of 95 percent anhydrous hydrazine is initiated. The temperature of the reaction mixture is maintained at between 0° C. and 10° C. throughout the addition of the hydrazine, during which time it is stirred vigorously. The stirring is continued for about ½ hour after completion of the addition of the hydrazine. A solution of 50 milliliters of concentrated hydrochloric acid (reagent grade, approximately 37–38 percent assay) in 200 milliliters of water is then added slowly to the reaction mixture and the dropping funnel is replaced by a fritted glass gas dispersion tube. Chlorine gas is then passed through the gas dispersion tube into the reaction mixture which results in the rapid evolution of gaseous byproduct (vigorous stirring and cooling are necessary to prevent excessive foaming of the reaction mixture). The addition of chlorine gas is continued until the solid suspended material in the reaction mixture has disappeared and gas is no longer evolved. The reaction mixture is allowed to warm to room temperature and the carbon tetrachloride and aqueous layers are separated. The carbon tetrachloride layer is washed with cold water and the solvent is removed leaving 442 grams (85 percent of theoretical) of n-perfluorooctane sulfonyl chloride product. This product is a heavy liquid which boils at 103 to 110° C. at 60 millimeters of mercury pressure. Upon redistillation a purified product, which boils at 108° C./60 millimeters of mercury pressure and has a refractive index ($n_D^{25}$) of 1.3278, is obtained. It is found to contain 6.95 percent of chlorine as compared to a calculated value of 6.84 percent. The infra-red spectrum of this product is consistent with the proposed structure.

EXAMPLE 2

About 168.3 grams (0.558 mole) of n-perfluorobutane sulfonyl fluoride and 400 milliliters of 1,1,2-trichloro-1,2,2-trifluoro ethane are placed in a round bottomed flask which is fitted with a reflux condenser, a dropping funnel and an agitator. The flask is placed in an ice bath and when the temperature of the n-perfluorobutane sulfonyl fluoride-1,1,2-trichloro-1,2,2-trifluoro ethane mixture has dropped to between 0° C. and 5° C. the dropwise addition of 75.2 grams (2.23 moles) of 95% anhydrous hydrazine is initiated. The temperature of the reaction mixture is maintained at between 0° C. and 10° C. throughout the addition of the hydrazine, during which time it is stirred vigorously. The stirring is continued for about one hour after completion of the addition of the hydrazine. The dropping funnel is replaced by a fritted glass gas dispersion tube and dry hydrogen chloride gas is passed through this tube into the reaction mixture (which is maintained at 0° C.) until it is no longer absorbed. Chlorine gas is next passed through the gas dispersion tube into the reaction mixture resulting in the rapid evolution of gaseous byproduct (vigorous stirring and cooling are necessary to prevent excessive foaming of the reaction mixture. The addition of chlorine gas is continued until the solid suspended material in the reaction mixture has disappeared and gas is no longer evolved. The reaction mixture (a single liquid phase) is distilled to recover the solvent and 147 grams (83% of theoretical) of n-perfluorobutane sulfonyl chloride product. This compound is a heavy liquid which boils at 97 to 102° C. at atmospheric pressure and has a refractive index ($n_D^{25}$) of from 1.3273 to 1.3269. The infra-red spectrum of this product is consistent with the proposed structure.

Still other members of the series of fluorocarbon sulfonyl chlorides can be made from the corresponding fluorocarbon sulfonyl fluorides by the process of the present invention. The following table shows two examples of these compounds together with their boiling points:

| Compound | Boiling Point |
|---|---|
| CF$_3$SO$_2$Cl | 32–33° C./742 mm. |
|  | 184° C./740 mm. |

The utility of the fluorocarbon sulfonyl chloride products of the present invention as chemical intermediates is illustrated by Examples 3, 4 and 5.

EXAMPLE 3

A mixture of 35 grams of 10-hendecenoic acid and 98 grams of perfluorooctanesulfonyl chloride is heated under reflux to 130–145° C. while slowly adding 1.6 grams of ditertiary butyl peroxide over a period of several hours. Sulfur dioxide is evolved and the mixture darkens. Vacuum distillation yields a white solid boiling at 190–

204° C./0.5 mm. of mercury and, after recrystallization from ethyl ether at subzero temperatures, melting at 82–83° C. The total yield is 79% (based on the amount of sulfonyl chloride consumed). When subjected to analysis, the product is found to contain 35.7% carbon, 50.7% fluorine and 5.58% chlorine as compared to calculated values of 35.8%, 50.6% and 5.56%, respectively. The indicated reaction is:

$$C_8F_{17}SO_2Cl + CH_2=CH(CH_2)_8COOH \longrightarrow$$
$$C_8F_{17}CH_2CHCl(CH_2)_8COOH + SO_2$$

Infra-red analysis confirms this structure. This product is then esterified with vinyl alcohol by mixing with a six-fold molar excess of vinyl acetate in acid solution and in the presence of catalytic amounts of mercuric acetate. The ester, containing 5.4% chlorine, is polymerized in the presence of acetyl peroxide to form a hard, opaque wax-like product having excellent resistance to wetting by both water and oil.

EXAMPLE 4

A mixture of 5.6 grams of vinylmethyldichlorosilane, 20.8 grams of perfluorooctanesulfonyl chloride and 0.3 gram of di-tertiary butyl peroxide are sealed in a glass ampoule and heated at 145° C. for 15 hours. Vacuum distillation of the reaction mixture results in the isolation of two well-defined reaction products.

*Product A*

Boiling point: 157° C./60 mm. of mercury
Refractive index ($n_D^{25}$): 1.3581

This product cotnains 22.2% carbon, 54.5% fluorine and 18.1% chlorine as compared to calculated values (based on $C_{11}H_6F_{17}Cl_3Si$) of 22.2%, 54.2% and 17.9%, respectively.

*Product B*

Boiling point: 188° C./20 mm. of mercury
Refractive index ($n_D^{25}$): 1.3926

This product contains 22.7% carbon, 44.1% fluorine and 23.7% chlorine as compared to calculated values (based on $C_{14}H_{12}F_{17}Cl_5Si_2$ of 22.8%, 43.8% and 24.1% respectively.

The reactions may therefore be indicated as follows:
For Product A:

$$C_8F_{17}SO_2Cl + CH_2=CHSiCH_3Cl_2$$
$$\rightarrow C_8F_{17}CH_2CHClSiCH_3Cl_2 + SO_2$$

For Product B:

$$C_8F_{17}SO_2Cl + 2CH_2=CHSiCH_3Cl_2 \longrightarrow$$
$$\underset{\underset{SiCH_3Cl_2}{|}}{C_8F_{17}CH_2CHCH_2CHClSiCH_3Cl_2} + SO_2$$

A portion of Product A is mixed with a slightly greater than molar quantity of methyl dichlorosilane and the mixture is hydrolyzed in water to give a viscous oil which when heated in an oven at 180° C. in thin film form is converted to a heat-stable transparent film which neither dissolves in nor is swollen by organic solvents. When applied as a solution in benzotrifluoride to cotton cloth and then dried and cured, the product imparts to the cloth the property of repellency to both water and oil.

EXAMPLE 5

A mixture of 11.0 grams of vinylmethyldiethoxy silane, 13.0 grams of perfluoromethane sulfonyl chloride and 1.0 gram of benzoylperoxide are sealed in a glass ampoule and heated at 80–90° C. for 18 hours. The product is distilled under vacuum and yields a liquid product boiling at 108° C. under a reduced pressure of 60 mm. of mercury and having a refractive index ($n_D^{25}$) of 1.3861. Analysis shows this product to correspond to the formula $CF_3CH_2CHClSiCH_3(OC_2H_5)_2$ (36.3% carbon, 21.5% fluorine and 13.3% chlorine as compared to calculated values of 36.3%, 21.5% and 13.4%, respectively).

The yield of this product is 45% of theoretical based on the reaction:

$$CF_3SO_2Cl + CH_2=CHSiCH_3(OC_2H_5)_2$$
$$\rightarrow CF_3CH_2CHClSiCH_3(OC_2H_5)_2 + SO_2$$

Smaller amounts of high-boiling liquid product and of non-volatile residue are also noted.

The experiment is duplicated and a further amount of high-boiling liquid product is recovered. It consists largely of a compound boiling at 112° C./10 mm., having a refractive index $n_D^{25}=1.4340$, and containing 42.2% carbon, 14.5% fluorine and 8.9% chlorine as compared to calculated values (based on $C_{15}H_{32}O_4F_3ClSi_2$) of 42.5%, 13.5% and 8.4%, respectively.

The compound is thus identified as:

$$\underset{\underset{SiCH_3(OC_2H_5)_2}{|}}{CF_3CH_2CHCH_2CHClSiCH_3(OC_2H_5)_2}$$

(the 1:2 adduct). Both of these products are hydrolyzed similarly to the product of Example 4. The resulting oily products are then homopolymerized, in this case by irradiation with beta rays. A soft rather crumbly but somewhat elastic polymer is obtained.

The terms and expressions which are employed herein are used as terms of description and not of limitation, and it is not intended, in the use of such terms and expressions, to exclude any equivalents of the features shown and described or portions thereof, but it is recognized that various modifications are possible within the scope of the invention claimed.

What is claimed is:

1. A process for the production of fluorocarbon sulfonyl chlorides which comprises interreacting at moderate temperature and in the presence of an inert solvent a compound represented by the formula $$R_fSO_2F$$

wherein $R_f$ is a saturated perfluoroalkyl group containing 1 to 18 carbon atoms, with an at least stoichiometric amount of hydrazine, treating the resulting reaction mixture with chlorine at moderate temperature and recovering therefrom a fluorocarbon sulfonyl chloride.

2. A process for the production of fluorocarbon sulfonyl chlorides which comprises interreacting, at a temperature in the range of about −5° C. to about +30° C. and in the presence of an inert solvent, a compound represented by the formula $$R_fSO_2F$$

wherein $R_f$ is a saturated perfluoroalkyl group containing 1 to 18 carbon atoms, with a stoichiometric excess of hydrazine to form the corresponding fluorocarbon sulfonyl hydrazide, treating the fluorocarbon sulfonyl hydrazide with chlorine in the presence of hydrogen chloride and an inert solvent at a temperature in the range of about −5° C. to about +30° C. and recovering therefrom a fluorocarbon sulfonyl chloride.

3. In the process for the production of fluorocarbon sulfonyl chlorides from fluorocarbon sulfonyl fluorides, the step which comprises subjecting the reaction product of hydrazine and a compound represented by the formula $$R_fSO_2F$$

wherein $R_f$ is a saturated perfluoroalkyl group containing 1 to 18 carbon atoms, to the action of chlorine in the presence of an inert solvent and hydrogen chloride at a temperature in the range of about −5° C. to about +30° C.

References Cited in the file of this patent

UNITED STATES PATENTS

| | | |
|---|---|---|
| 2,680,120 | Gregory | June 1, 1954 |
| 2,732,398 | Brice | Jan. 24, 1956 |

OTHER REFERENCES

Davies: J. Chem. Soc. (London), 1931, pp. 624–9.